US011256990B2

United States Patent
Lanctot et al.

(10) Patent No.: US 11,256,990 B2
(45) Date of Patent: Feb. 22, 2022

(54) MEMORY-EFFICIENT BACKPROPAGATION THROUGH TIME

(71) Applicant: DEEPMIND TECHNOLOGIES LIMITED, London (GB)

(72) Inventors: Marc Lanctot, London (GB); Audrunas Gruslys, London (GB); Ivo Danihelka, London (GB); Remi Munos, London (GB)

(73) Assignee: DeepMind Technologies Limited, London (GB)

(*) Notice: Subject to any disclaimer, the term of this patent is extended or adjusted under 35 U.S.C. 154(b) by 709 days.

(21) Appl. No.: 16/303,101

(22) PCT Filed: May 19, 2017

(86) PCT No.: PCT/US2017/033698
§ 371 (c)(1),
(2) Date: Nov. 19, 2018

(87) PCT Pub. No.: WO2017/201507
PCT Pub. Date: Nov. 23, 2017

(65) Prior Publication Data
US 2019/0188572 A1    Jun. 20, 2019

Related U.S. Application Data

(60) Provisional application No. 62/339,784, filed on May 20, 2016.

(51) Int. Cl.
*G06N 3/08* (2006.01)
*G06N 3/04* (2006.01)

(52) U.S. Cl.
CPC ........... *G06N 3/084* (2013.01); *G06N 3/0445* (2013.01)

(58) Field of Classification Search
CPC ..................... G06N 3/084; G06N 3/0445
See application file for complete search history.

(56) References Cited

PUBLICATIONS

Tianqi Chen et al. "Training deep nets with sublinear memory cost" arXiv preprint arXiv: 1604.06174 (Year: 2016).*

(Continued)

*Primary Examiner* — Luis A Sitiriche
*Assistant Examiner* — Adam C Standke
(74) *Attorney, Agent, or Firm* — Fish & Richardson P.C.

(57) ABSTRACT

Methods, systems, and apparatus, including computer programs encoded on a computer storage medium, for training a recurrent neural network on training sequences using backpropagation through time. In one aspect, a method includes receiving a training sequence including a respective input at each of a number of time steps; obtaining data defining an amount of memory allocated to storing forward propagation information for use during backpropagation; determining, from the number of time steps in the training sequence and from the amount of memory allocated to storing the forward propagation information, a training policy for processing the training sequence, wherein the training policy defines when to store forward propagation information during forward propagation of the training sequence; and training the recurrent neural network on the training sequence in accordance with the training policy.

17 Claims, 4 Drawing Sheets

(56) References Cited

PUBLICATIONS

'www.werbos.com' [online] "Backwards differentiation in AD and neural nets: past links and new opportunities," Feb. 27, 2006 [retrieved on Jul. 26, 2017] Retrieved from Internet: URL<http://www.werbos.com/AD2004.pdf> 16 pages.

Chen et al. "Training deep nets with sublinear memory cost," arXiv 1604.06174v2, Apr. 22, 2016, 12 pages.

Graves et al. "Generating Sequences with Recurrent Neural Networks," arXiv 1308.0850v5, Jun. 5, 2014, 43 pages.

LeCun et al. "Efficient BackProp," Neural Networks: Tricks of the trade, Springer, Berlin, Heidelberg, 2012, 44 pages.

MacLaurin et al. "Gradient-based hyperparameter optimization through reversible learning," arXiv 1502.03492v3, Apr. 2, 2015, 10 pages.

Martens et al. "Training deep and recurrent networks with hessian-free optimization," Lecture Notes in Computer Science vol. 7700, 2012, 57 pages.

PCT International Preliminary Report on Patentability issued in International Application No. PCT/US2017/033698, dated Oct. 15, 2018, 12 pages.

PCT International Search Report and Written Opinion issued in International Application No. PCT/US2017/033698, dated Aug. 9, 2017, 15 pages.

PCT Written Opinion issued in International Application No. PCT/US2017/033698, dated May 18, 2018, 8 pages.

Werbos. "Backpropagation Through Time: What it Does and How Does it Do It," Proceedings of the IEEE, 78(10), Oct. 1990, 11 pages.

Zaremba et al. "Reinforcement learning neural Turing machines—revised," arXiv 1505.00521v3, Jan. 12, 2016, 13 pages.

Dauvergne et al. "The data-flow equations of checkpointing in reverse automatic differentiation," Computer Science-ICCS 2006, Springer, May 28, 2006, 8 pages.

Eck et al. "A first look at music composition using LSTM recurrent neural networks," Istituto Dalle Molle Di Stadi Sull Intelligenza Artificiale, 103, Mar. 15, 2002, 11 pages.

Graves et al. "Speech recognition with deep recurrent neural networks," arXiv1303.5778v1, Mar. 22, 2013, 5 pages.

Graves et al. "Neural turing machines," arXiv 1410.5401v2, Dec. 10, 2014, 26 pages.

Grenstette et al. "Learning to transduce with unbounded memory," Advances in Neural Information Processing Systems, Dec. 2015, 9 pages.

Gregor et al. "Draw: A recurrent neural network for image generation," arXiv 1502.04623v2, May 20, 2015, 10 pages.

Hochreiter et al. "Long short-term memory," Neural computation 9(8), Nov. 15, 1997, 32 pages.

Mnih et al. "Asynchronous methods for deep reinforcement learning," Proceedings of the International conference on Machine Learning, Jun. 11, 2016, 10 pages.

Rumelhart et al. "Learning internal representations by error propagation," ICS Report 8506, Technical report, DTIC Document, Institute for Cognitive Science, University of California, San Diego, Sep. 1985, 49 pages.

Sorokin et al. "Deep attention recurrent Q-network," arXiv 1512.01693, Dec. 5, 2015, 7 pages.

Sutskever et al. "Generating text with recurrent neural networks," Proceedings of the 28$^{th}$ International Conference on Machine Learning, Jun. 2011, 8 pages.

* cited by examiner

MEMORY-EFFICIENT BACKPROPAGATION THROUGH TIME

This application is a national stage application under 35 U.S.C. 371 of international application no. PCT/US2017/033698, filed May 19, 2017, which claims priority to U.S. provisional patent application No. 62/339,784, filed May 20, 2016, the entire contents of which are hereby incorporated by reference.

BACKGROUND

This specification relates to training recurrent neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, one innovative aspect of the subject matter described in this specification can be embodied in methods performed by one or more computers for training a recurrent neural network on a plurality of training sequences using backpropagation through time that include the actions receiving a training sequence including a respective input at each of a number of time steps; obtaining data defining an amount of memory allocated to storing forward propagation information for use during backpropagation; determining, from the number of time steps in the training sequence and from the amount of memory allocated to storing the forward propagation information, a training policy for processing the training sequence, wherein the training policy defines when to store forward propagation information during forward propagation of the training sequence; and training the recurrent neural network on the training sequence in accordance with the training policy.

Other embodiments of this aspect can include one or more of the following optional features. In some implementations, training the recurrent neural network on the training sequence includes forward-propagating the inputs in the training sequence from a first time step in the sequence to a last time step in the sequence; during the forward propagating, storing forward propagation information in accordance with the training policy; and backpropagating gradients from the last time step in the sequence to the first time step in the sequence, including determining, for each time step, whether additional forward propagation information is necessary to backpropagate the gradient for the time step and, if so, regenerating the additional forward propagation information using the stored forward propagation information.

In some implementations, the forward propagation information includes hidden states. In some implementations, the forward propagation information includes internal states. In some implementations, the forward propagation information includes hidden states and internal states. In some implementations, the training policy defines, for each time step, whether to store a hidden state, an internal state, or neither for the time step. In some implementations, determining the policy includes determining a policy that balances a trade-off between caching of forward propagation information and re-computation of forward propagation information during backpropagation.

In some implementations, determining the policy includes, for each time slot, determining a computational cost of storing an associated piece of forward propagation information based on the number of time steps and the amount of memory allocated to storing the forward propagation information, and adding to the training policy a set of pieces of forward propagation information that are determined to have the lowest computational cost; and—training the recurrent neural network on the training sequence in accordance with the training policy includes storing the set of pieces of forward propagation information that have been added to the training policy.

In some implementations, the methods include the actions of determining a computational cost of training the recurrent neural network on the training sequence in accordance with the policy. In some implementations, the methods include the actions of providing data identifying the computational cost for presentation to a user.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The subject matter described in this specification can be implemented in particular embodiments so as to realize one or more of the following advantages. By employing the memory-efficient backpropagation through time techniques described in this specification, recurrent neural networks (RNNs) can be trained using training techniques that are less memory-intensive and efficiently utilize the memory allocated to train the RNNs. Accordingly, the time required to train an RNN can be reduced when the amount of memory available for training the RNN is less than the amount of memory needed to store all forward propagation information associated with the RNN. An RNN can be trained with processing circuits that can perform faster processing but have lower memory capacities, such as graphic processing units that have lower memory capacities than many central processing units. In addition, by optimizing the computational cost of training RNNs the methods described herein are more efficient with regard to computational resources and may be performed on less powerful computers.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
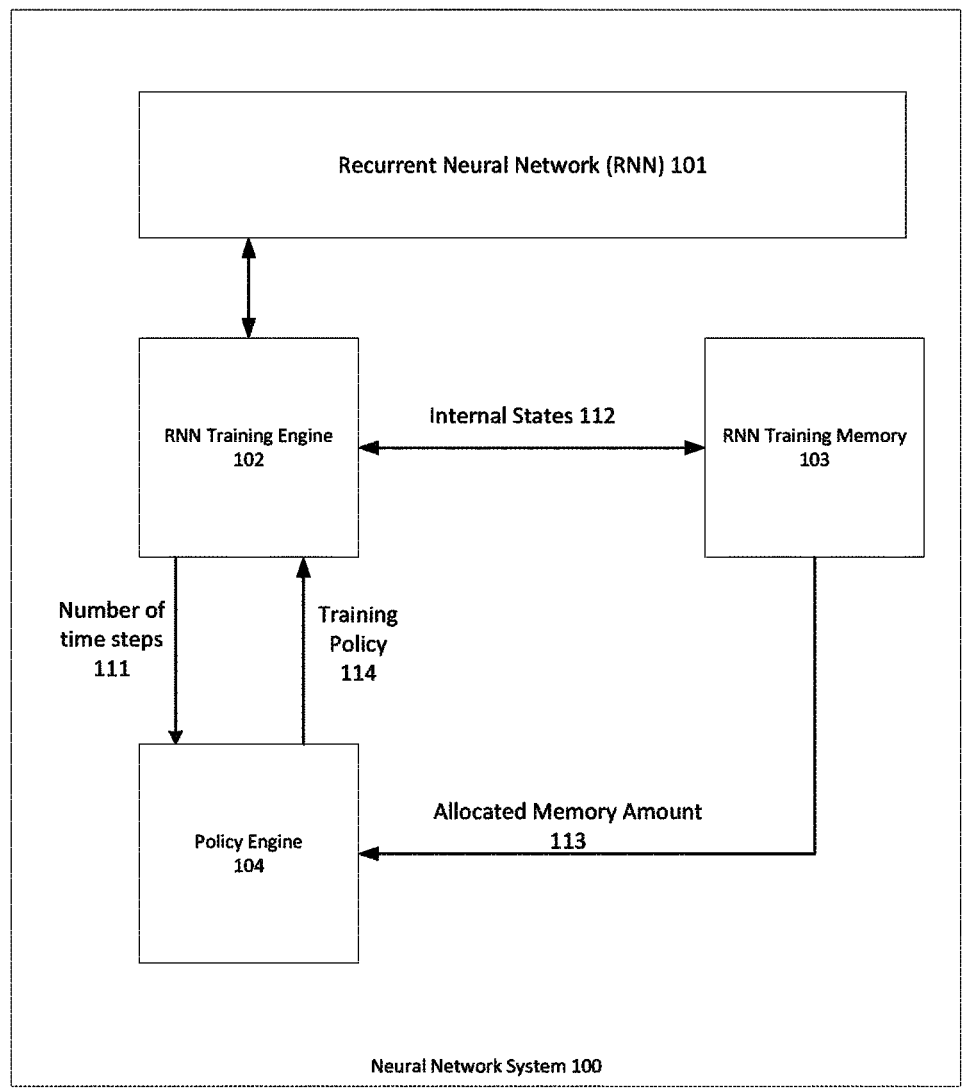
FIG. 1 is a block diagram of an example neural network system.

FIG. 1 is a block diagram of an example neural network system 100. The neural network system 100 is an example of a system implemented as computer programs on one or more computers in one or more locations, in which the systems, components, and techniques described below can be implemented.

The neural network system 100 includes a recurrent neural network (RNN) 101, an RNN training engine 102, an RNN training memory 103, and a policy engine 104. The RNN training engine 102 trains the RNN 101 by, in part, storing selected forward propagation information 112 in the RNN training memory 103. The RNN training engine 102 determines which forward propagation information 112 to store in the RNN training memory 103 based on a training policy 114 determined by the policy engine 104.

The RNN 101 is an example neural network having multiple parameters that includes at least one recurrent neural network layer. At each time step of multiple time steps, the RNN 101 is configured to process an input from a sequence of inputs and, for each time step except for the first time step, a hidden state from a preceding time step in accordance with current values of the parameters to generate an output for the time step and an updated hidden state for the time step for use at a subsequent time step.

Examples of tasks that can be performed using an RNN 101 include translation, conversion of text to speech, and generating sequential data such a sequence of words or letters. The RNN 101 can be a conventional RNN or a long-short term memory (LSTM) RNN. Example LSTM RNNs are described in Graves, *Generating Sequences with Recurrent Neural Networks*.

The RNN training engine 102 trains the RNNs by adjusting the values of the parameters of the RNN 101 to optimize an optimization function that depends on a measure of error between outputs generated by the RNN for a number of time steps and target outputs.

The RNN training engine 102 can train the RNN using a training algorithm known as backpropagation through time (BPTT). Example BPTT algorithms are described in Rumelhart et al., *Learning Internal Representations by Error Propagation*, and Webos, *Backpropagation Through Time: What It Does and How to Do It*.

To train an RNN 101 using BPTT on a given training sequence, the RNN training engine 102 evaluates the gradient of the parameters of the RNN 101 with respect an objective loss function to optimize the objective loss function. The RNN training engine 102 can do this this in two steps. First, the RNN training engine 102 performs a forward propagation by processing inputs to the RNN 101 at each time step while saving only selected forward propagation information 112 into training memory 103 as indicated by the training policy 104. After the forward propagation, the RNN training engine 102 calculates a measure of error between the outputs of the RNN 101 for the number of time steps and a target set of outputs and uses the measure of error to backpropagate gradients of the parameters of the RNN 101 with respect to the objective function throughout the RNN 101.

The forward propagation information 112 allows the RNN training engine 102 to continue the forward propagation from a last, e.g., the most recent, saved time step of the RNN 101 whose corresponding forward propagation information are saved in the training memory 103 without reprocessing the time steps of the RNN 101 before the last saved time step.

To backpropagate gradients from a particular time step in a sequence of time steps of the RNN 102, the RNN training engine 102 can read the last saved forward propagation information 112 in the sequence from the training memory 103. The RNN training engine 102 can perform another forward propagation over the sequence starting at the time step of the last saved forward propagation information 112 and ending at the particular time step from which the RNN training engine 102 is backpropagating gradients in order to obtain forward propagation information of the particular time step. During the repeated forward propagation, the RNN training engine 102 may store intermediate states as defined by the policy 104.

After the RNN training engine 102 obtains the forward propagation information 112 of the particular time step from which the RNN training engine 102 is backpropagating gradients, the RNN training engine 102 can compute the gradients of the particular time step and backpropagate gradients from the particular time step. Backpropagating gradients backward across a single time step is described in more detail in LeCun et al., *Efficient BackProp*.

The RNN training engine 102 can repeat the process described above for backpropagating gradients from a particular time step of the RNN 101 until the gradients are backpropagated to the beginning of the sequence of time steps of the RNN 101 that includes the particular time step. For example, the RNN training engine 102 can repeat the process starting from a last time step in a sequence of time steps of the RNN 101 to a first time step in the sequence to backpropagate the gradients throughout the sequence.

In some implementations, the forward propagation information 112 for a time step of the RNN 101 only includes the hidden state output of the RNN 101, while in other implementations the forward propagation information 112 for a time step can include all internal states of the RNN 101 at a given time step.

The internal states of the RNN 101 for a time step are the activations of the RNN for the time step. For example, in a traditional RNN, the internal states of the RNN 101 for a time step includes the hidden state for the time step, because a traditional RNN processes the hidden state to generate the updated hidden state for a time step. In other RNNs, however, the internal states of the RNN for a time step can include activations for the time step other than and in addition to the hidden state for the time step. For example, in an LSTM, the internal states of the LSTM may include values of gates of the LSTM 101 during the time step in addition to the hidden state of the time step, because the LSTM first processes the hidden state to update its gates and then uses the values of the gates to generate the updated hidden state for the time step. In some implementations, a hidden state of an RNN 101 for a time step is also part of the internal states of the RNN 101 for the time step.

To obtain a particular item of the forward propagation information 112, the RNN training engine 101 can store the internal state in the RNN training memory 103 during forward propagation and retrieve the stored item during backpropagation. However, consistent application of this approach can lead to excessive storage costs especially for RNNs that execute for a large number of time steps.

Alternatively, the RNN training engine 102 can obtain a particular item of the forward propagation information 112 by performing a forward propagation of all or part of time steps of the RNN 101 to reconstruct the particular item. For example, if the RNN training engine 102 has not stored any forward propagation information 112 in the RNN training memory 103, the RNN training engine 102 can obtain a hidden state value for an ith time step of the RNN 101 by performing a forward propagation from the first time step of the RNN 101 to a (i−1)th time step of the RNN 101. If the RNN training engine 101 has stored the hidden state for a time step of the RNN 101, the RNN training engine 102 can process the hidden state to generate the internal states for the time step using only one forward propagation, i.e., the propagation through the particular time step.

Thus, the RNN training engine 102 can use stored forward propagation information 112 to re-generate forward propagation information 112 that are not stored. This approach can reduce the amount of memory needed to train an RNN. However, consistent application of this approach can make training the RNN 101 computationally costly due to the computational costs associated with repeated forward propagations.

The policy engine 104 receives as inputs an amount of memory 113 allocated to storing forward propagation information 112 for use during backpropagation and a number of time steps 111 during which the RNN is being trained 101. The policy engine 104 uses those inputs to determine a training policy 114. The training policy 114 defines when to store forward propagation information during forward propagation of the training sequence. In other words, the training policy 114 defines which items in the forward propagation information 112 to store in the RNN training memory 103.

The RNN training engine 102 uses the training policy 114 to determine which items of items in the forward propagation information 112 to store in the RNN training memory 103 and which items in the forward propagation information 112 to re-generate during backpropagation.

Determining a training policy 114 is described in greater detail below with reference to FIG. 3.

Figure 2:
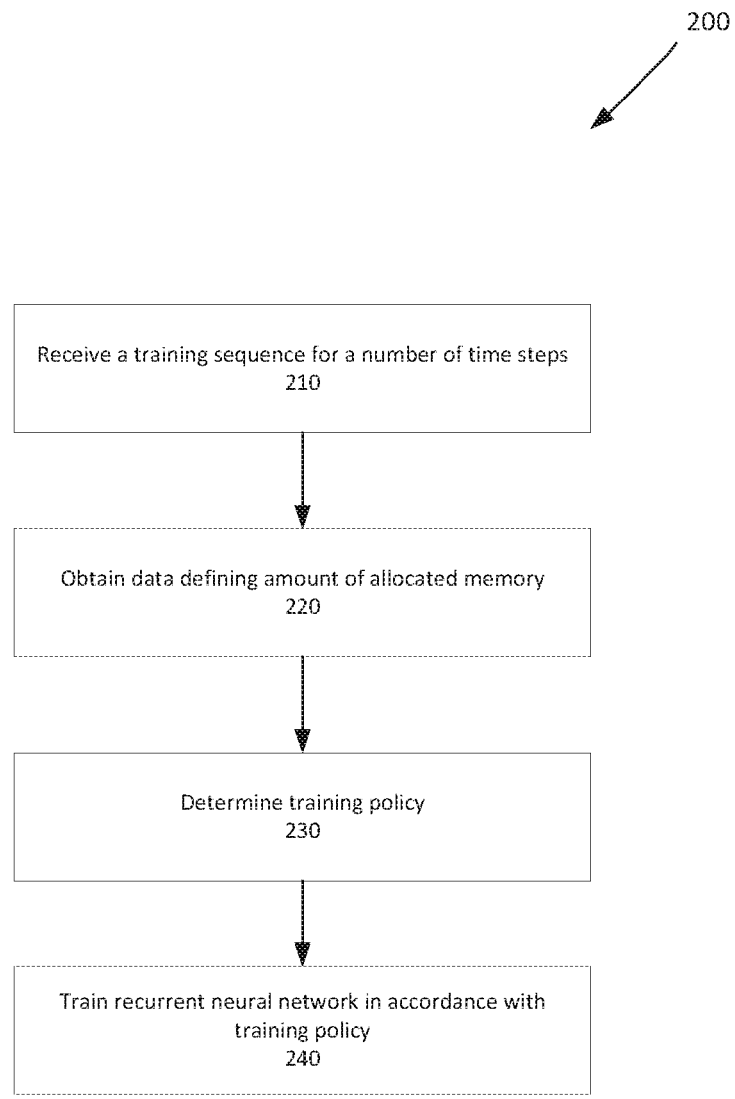
FIG. 2 is a flow diagram of an example process for training a recurrent neural network.

FIG. 2 is a flow diagram of an example process 200 for training a recurrent neural network. For convenience, the process 200 will be described as being performed by a system of one or more computers located in one or more locations. For example, a neural network system, e.g., the neural network system 100 of FIG. 1, appropriately programmed in accordance with this specification, can perform the process 200.

The system receives a training sequence including a respective input to the RNN at each of a number of time steps (210) and obtains data defining an amount of memory allocated to storing forward propagation information for use during backpropagation (220). The system generally samples the training sequence from a set of training data for use in training the RNN. The amount of allocated memory is usually supplied by a computer application that manages memory resources for the system, such as an operating system or other memory management application. The computer application managing memory resources for the system allocates a certain amount of memory to the system for storing forward propagation. The amount of memory is an amount in a particular unit of memory, e.g., bytes, and can be memory available for use by the system in a single storage device or in multiple physical storage devices in one or more physical locations.

The system determines a training policy (230) from the number of time steps in the training sequence and from the amount of memory allocated to storing the forward propagation information. In some implementations, the system determines a training policy that balances a trade-off between caching of forward propagation information and re-computation of forward propagation information during backpropagation. Determining a training policy 114 is described in greater detail below with reference to FIG. 3.

The system then trains the recurrent neural network (240) on the training sequence in accordance with the training policy.

In some implementations, the system forward propagates the inputs in the training sequence from a first time step in the sequence to a last time step in the sequence. During the forward propagation, the system stores some forward propagation information in accordance with the training policy. After the forward propagation, the system backpropagates gradients from the last time step in the sequence to the first time step in the sequence. During backpropagation, for each time step, the system determines whether additional forward propagation information items are necessary to backpropagate the gradient for the time step, i.e., based on determining whether the system has stored all the forward propagation information necessary to backpropagate the gradient for the time step. If the system determines that additional forward propagation information items are necessary to backpropagate the gradient for the time step, the system re-generates the additional forward propagation information items using the stored forward propagation information.

The system can re-generate a particular item of the forward propagation information by performing a forward propagation of all or part of time steps of the RNN. For example, the system can generate a hidden state value for an ith time step of the RNN 101 by performing a forward propagation from the first time step of the RNN to a (i−1)th time step of the RNN. The system can also process a hidden state for an ith time step to generate the internal states for the (i+1)th time step using only one forward propagation, i.e., the propagation through the (i+1)th time step.

Figure 3:
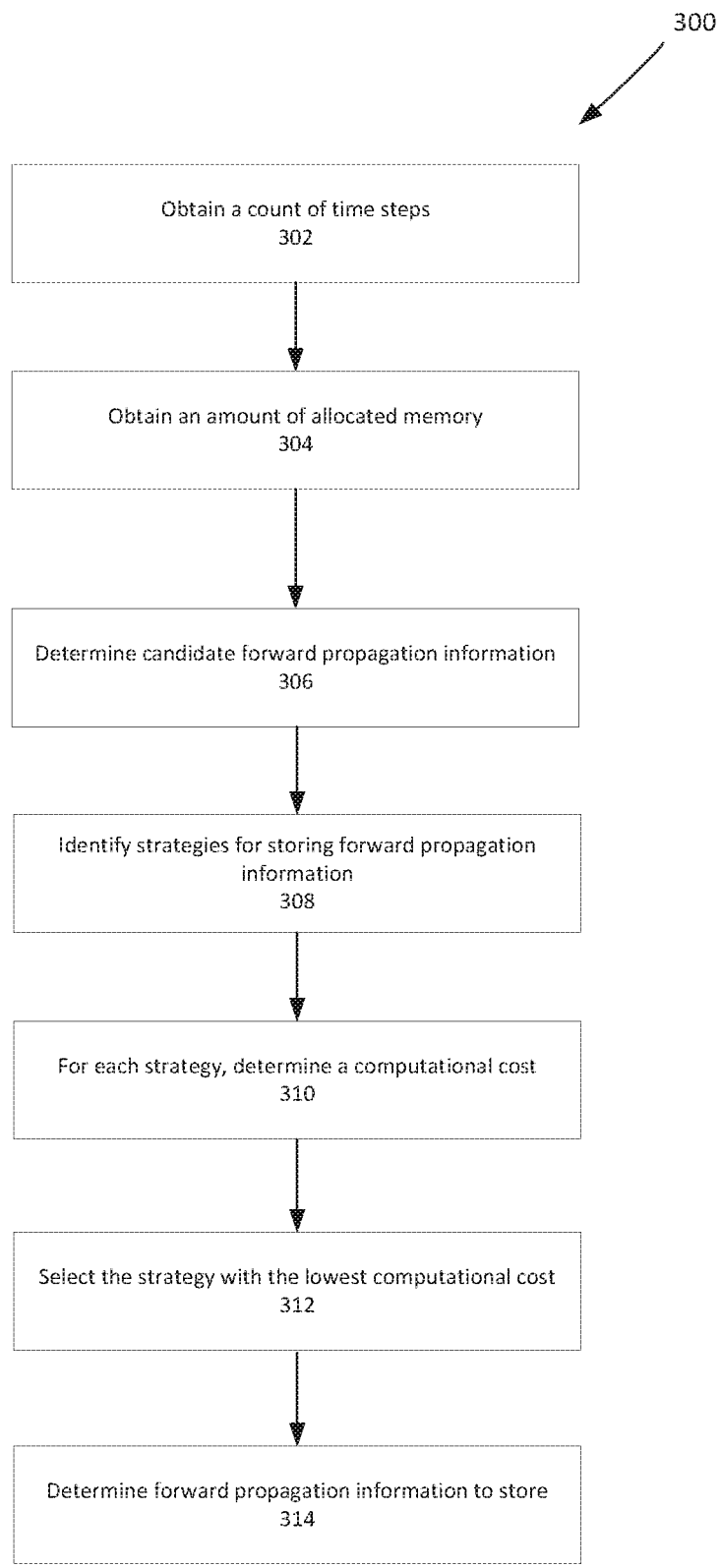
FIG. 3 is a flow diagram of an example process for determining which forward propagation information to store.

FIG. 3 is a flow diagram of an example process 300 for determining which forward propagation information to store. For convenience, the process 300 will be described as being performed by a system of one or more computers located in one or more locations. For example, a neural network system, e.g., the neural network system 100 of FIG. 1, appropriately programmed in accordance with this specification, can perform the process 300.

The system obtains a count of time steps during which a recurrent neural network is trained (302) and an amount of memory allocated to storing forward propagation information for use during backpropagation (304). The count of time steps during which an RNN is trained is generally equal to the number of inputs in a batch of input sequences for an RNN.

The system determines forward propagation information that are candidates for storage (306). The candidate forward propagation information can include hidden states for time steps of the RNN and/or internal states for time steps of the RNN.

The system identifies one or more strategies for storing forward propagation information from the training memory (308). A strategy includes a sequence of candidates for storage that the system will store if the system is following the strategy.

The system determines a computational cost for each strategy (310). The computational cost of a strategy is an estimated computational cost, e.g., in terms of the number of forward propagations needed to generate all forward propagation information necessary to perform backpropagation during training of the recurrent neural network, of training the RNN if the system follows the strategy.

In some implementations, the computational cost of a strategy that includes saving a hidden state of a time step after choosing not to save hidden states for y time steps is given by the following equation for $Q_1(t,m,y)$, where t is a number of time steps over which backpropagation is performed and m is a number of available memory units:

$$Q_1(t,m,y)=y+C(y,m)+C(t-y,m-1)$$

The computational cost of a strategy that includes saving internal states of a time step after choosing not to save internal states for y time steps is given by the following equation for $Q_2(t,m,y)$, where t is a number of time steps over which backpropagation is performed, m is a number of available memory units, and a is a ratio of size of internal states for time steps to the size of hidden states for time steps:

$$Q_2(t,m,y)=y+C(y-1,m)+C(t-y,m-\alpha)$$

In the above equations, C(t,m) is the optimal cost, i.e., the lowest possible computational cost, of backpropagating over a sequence of t time steps given the amount of allocated memory equal to m. The system can compute the C(t,m) values in the equations using dynamic programming with the following boundary conditions: $C(t,1)=\frac{1}{2}t(t+1)$ and $C(0,m)=0$ The system selects the strategy having the lowest computational cost (312) and determines a position of next storage and a type of forward propagation information from the selected strategy (314).

The system can select the forward propagation information having the type i (i.e., i=1 for hidden states and i=1 for internal states) and being at a position y in a sequence of time steps in a manner that produces a lowest computational cost strategy and determine to store the selected forward propagation information. In other words, the system selects i and y in accordance with $\operatorname{argmin}_{i,y} Q_i(t,m,y)$.

The system can repeat process 300 to generate a training strategy for a sequence of time steps of an RNN. For example, the system can use the process 300 to determine a position and a type of selected forward propagation information that the system will first save. After saving the selected forward propagation information, the system can divide sequence of time steps into two subsequences, a first subsequence including time steps before the time step of the selected forward propagation information as well as the time step of the selected forward propagation information and a second subsequence including time steps after the time step of the selected forward propagation information. The system can perform process 300 on each subsequence given the count of time steps of each subsequence using a divide-and-conquer strategy to select a position and type of next forward propagation information to save.

Determining a training policy with the technique described above that uses a recursive divide and conquer approach with dynamic programming can be performed using an algorithm laid out in the pseudocode below:

```
Algorithm 1: BPTT-HSM strategy evaluation.

input: t_max – maximum sequence length;
       m_max – maximum memory capacity
1  EvaluateStrategy(t_max, m_max)
2    Let C and D each be a 2D array of size t_max × m_max
3    for r ∈ {1, . . . , t_max} do
4        C[t][1] ← t(t + 1)
                   ─────────
                       2
5        for m ∈ {1, . . . , m_max} do
6            C[t][m] ← 2t - 1
7            D[t][m] ← 1
8        for m ∈ {2, . . . , m_max} do
9            for t ∈ {m + 1, . . . , t_max} do
10               C_min ← ∞
11               for y ∈ {1, . . . , t - 1} do
12                   c ← y + C[y][m] + C[t - y][m - 1]
13                   if c < C_min then
14                       C_min ← c
15                       D[t][m] ← y
16               C[t][m] ← C_min
17 return (C, D)
```

Executing a computed training policy can be performed using an algorithm laid out in the pseudocode below:

```
Algorithm 2: BPTT-HSM strategy execution.

input : D - previously evaluated policy; rnnCore - mutable RNN core network; stack - a stack
        containing memorized hidden states; gradHidden - a gradient with respect to the last hidden
        state; m - memory capacity available in the stack; t - subsequence length; s - starting
        subsequence index;
1  EXECUTESTRATEGY(D, rnnCore, stack, gradHidden, m, t, s)
2      hiddenState = PEEK(stack)
3      if t = 0 then
4          return gradHidden
5      else if t = 1 then
6          output ← FORWARD(rnnCore, GETINPUT(s), hiddenState)
7          gradOutput ← SETOUTPUTANDGETGRADOUTPUT(s + t, output)
8          (gradInput, gradHiddenPrevious) ← BACKWARD(rnnCore, GETINPUT(s), hiddenState,
9                                           gradOuput, gradHidden)
10         SETGRADINPUT(s + t, gradInput)
11         return gradHiddenPrevious
12     else
13         y ← D[t][m]
14         for i ∈ {0,..., t - 1} do
15             output, hiddenState ← FORWARD(rnnCore, GETINPUT(s + i), hiddenState)
16         PUSH(stack, hiddenState)
17         gradHiddenR ← EXECUTESTRATEGY(D, rnnCore, stack, gradHidden, m - 1, t - y, s + y)
```

| Algorithm 2: BPTT-HSM strategy execution. |
|---|
| 18      Pop(stack) |
| 19      gradHiddenL ← EXECUTESTRATEGY(D, rnnCore, stack, gradHiddenR, m, y, s) |
| 20      return gradHiddenL |

Figure 4:
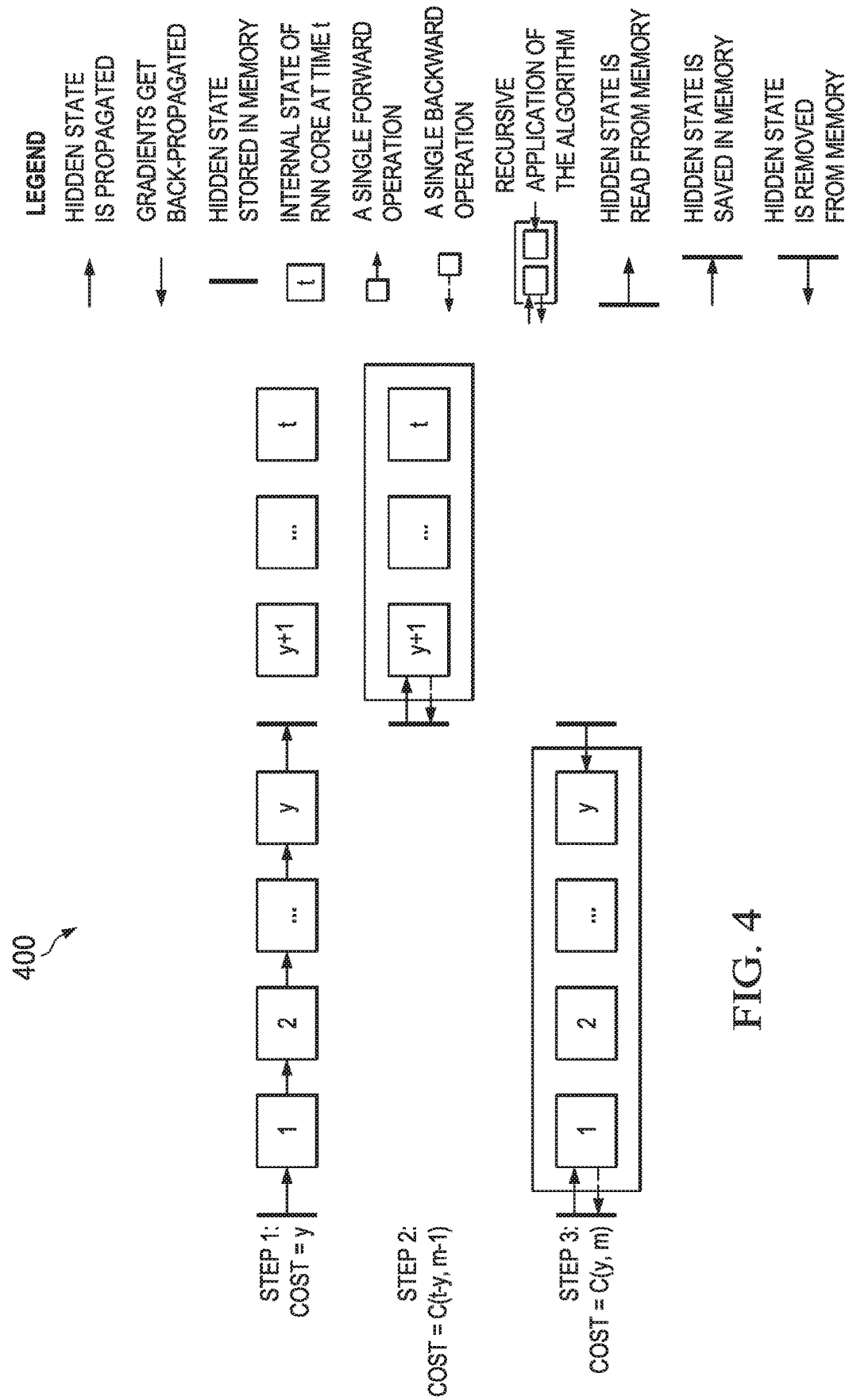
FIG. 4 is an operational example that illustrates saving forward propagation information.

FIG. 4 is an operational example 400 that illustrates saving forward propagation information. The operational example 400 illustrates saving a hidden state at a position y and dividing a sequence of time steps including the time step at the position y into two subsequences: a first subsequence that includes the portion of the sequence before and including the position y and a second subsequence after position y.

A training engine configured to train an RNN can perform the division technique illustrated in the operational example 400 on subsequences in a recursive manner and using a divide-and-conquer approach. By doing this, the training engine can determine the computational cost of a strategy that involves saving forward propagation information at a position y and following an optimal, i.e., lowest computational cost, training policy after storing the forward propagation information at the position y. The system can use the determined computational cost to perform a process for determining which forward propagation information to store, e.g., the process 300 of FIG. 3.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for training a recurrent neural network on a plurality of training sequences using backpropagation through time, the method comprising:

receiving a training sequence comprising a respective input at each of a number of time steps;

determining a training policy for processing the training sequence, wherein the training policy defines when to store forward propagation information during forward propagation of the training sequence, the training policy being such as to balance a trade-off between caching of forward propagation information and re-computation of forward propagation information during backpropagation;

wherein determining the training policy comprises:

(i) obtaining data defining an amount of memory allocated to storing forward propagation information for use during backpropagation;

(ii) determining forward propagation information in the form of candidates for storage, wherein the candidate forward propagation information can include hidden states for time steps of the recurrent neural network and/or internal states for time steps of the recurrent neural network;

(iii) identifying one or more strategies for storing forward propagation information from memory, wherein each strategy includes a sequence of candidates for storage that will be stored if following the strategy;

(iv) determining a computational cost for each strategy; wherein the computational cost $Q_1(t, m, y)$ of a strategy that includes saving a hidden state of a time step after choosing not to save hidden states for y time steps is given by:

$$Q_1(t,m,y) = y + C(y,m) + C(t-y, m-1)$$

where t is a number of time steps over which backpropagation is performed, m is a number of available memory units, $C(y, m)$ is the lowest possible computational cost of backpropagating over a sequence of y time steps given the amount of allocated memory equal to m; and $C(t-y, m-1)$ is the lowest possible computational cost of backpropagating over a sequence of t-y time steps given the amount of allocated memory equal to m-1, and the computational cost $Q_2(t, m, y)$ of a strategy that includes saving internal states of a time step after choosing not to save internal states for y time steps is given by:

$$Q_2(t,m,y)=y+C(y-1,m)+C(t-y,m-\alpha)$$

where t is a number of time steps over which backpropagation is performed, m is a number of available memory units, α is a ratio of size of internal states for time steps to the size of hidden states for time steps, C(y−1, m) is the lowest possible computational cost of backpropagating over a sequence of y−1 time steps given the amount of allocated memory equal to m, and C(t−y, m−α) is the lowest possible computational cost of backpropagating over a sequence of t−y time steps given the amount of allocated memory equal to m−α;

(v) selecting the strategy having the lowest computational cost;

(vi) determining the position of next storage and type of forward propagation from the selected strategy;

(vii) dividing the sequence of time steps in the training sequence to obtain a first subsequence and second subsequence, the first subsequence including time steps before the determined position of next storage, the second subsequence including time steps after the determined position of next storage; and recursively repeating steps (i)-(vii) for each obtained subsequence to select a position of next forward propagation information to save;

the method further comprising:

training the recurrent neural network on the training sequence in accordance with the training policy by:

forward-propagating the inputs in the training sequence from a first time step in the sequence to a last time step in the sequence;

during the forward propagating, storing forward propagation information in accordance with the training policy; and backpropagating gradients from the last time step in the sequence to the first time step in the sequence, comprising:

determining, for each time step, whether additional forward propagation information is necessary to backpropagate the gradient for the time step and, if so, regenerating the additional forward propagation information using the stored forward propagation information.

2. The method of claim 1, wherein the forward propagation information includes hidden states.

3. The method of claim 1, wherein the forward propagation information includes internal states.

4. The method of claim 1, wherein the forward propagation information includes both hidden states and internal states.

5. The method of claim 4, wherein the training policy defines, for each time step, whether to store a hidden state, an internal state, or neither for the time step.

6. The method of claim 1, wherein:

determining the policy comprises:

for each time slot, determining a computational cost of storing an associated piece of forward propagation information based on the number of time steps and the amount of memory allocated to storing the forward propagation information;

adding to the training policy a set of pieces of forward propagation information that are determined to have the lowest computational cost; and training the recurrent neural network on the training sequence in accordance with the training policy comprises storing the set of pieces of forward propagation information that have been added to the training policy.

7. The method of claim 1, further comprising:

determining a computational cost of training the recurrent neural network on the training sequence in accordance with the policy.

8. The method of claim 7, further comprising: providing data identifying the computational cost for presentation to a user.

9. One or more non-transitory computer storage media encoded with instructions that, when executed by one or more computers, cause the one or more computers to perform operations for training a recurrent neural network on a plurality of training sequences using backpropagation through time, the operations comprising:

receiving a training sequence comprising a respective input at each of a number of time steps;

determining a training policy for processing the training sequence, wherein the training policy defines when to store forward propagation information during forward propagation of the training sequence, the training policy being such as to balance a trade-off between caching of forward propagation information and re-computation of forward propagation information during backpropagation;

wherein determining the training policy comprises:

(i) obtaining data defining an amount of memory allocated to storing forward propagation information for use during backpropagation;

(ii) determining forward propagation information in the form of candidates for storage, wherein the candidate forward propagation information can include hidden states for time steps of the recurrent neural network and/or internal states for time steps of the recurrent neural network;

(iii) identifying one or more strategies for storing forward propagation information from memory, wherein each strategy includes a sequence of candidates for storage that will be stored if following the strategy;

(iv) determining a computational cost for each strategy; wherein the computational cost $Q_1(t, m, y)$ of a strategy that includes saving a hidden state of a time step after choosing not to save hidden states for y time steps is given by:

$$Q_1(t,m,y)=y+C(y,m)+C(t-y,m-1)$$

where t is a number of time steps over which backpropagation is performed, m is a number of available memory units, C(y, m) is the lowest possible computational cost of backpropagating over a sequence of y time steps given the amount of allocated memory equal to m; and C(t−y, m−1) is the lowest possible computational cost of backpropagating over a sequence of t−y time steps given the amount of allocated memory equal to m−1, and the computational cost $Q_2(t, m, y)$ of a strategy that includes saving internal states of a time step after choosing not to save internal states for y time steps is given by:

$$Q_2(t,m,y)=y+C(y-1,m)+C(t-y,m-\alpha)$$

where t is a number of time steps over which backpropagation is performed, m is a number of available memory units, α is a ratio of size of internal states for time steps to the size of hidden states for time steps, C(y−1, m) is the lowest possible computational cost of backpropagating over a sequence of y−1 time steps given the amount of allocated memory equal to m, and C(t−y, m−α) is the lowest possible computational cost of backpropagating over a sequence of t−y time steps given the amount of allocated memory equal to m−α;
(v) selecting the strategy having the lowest computational cost;
(vi) determining the position of next storage and type of forward propagation from the selected strategy;
(vii) dividing the sequence of time steps in the training sequence to obtain a first subsequence and second subsequence, the first subsequence including time steps before the determined position of next storage, the second subsequence including time steps after the determined position of next storage; and
recursively repeating steps (i)-(vii) for each obtained subsequence to select a position of next forward propagation information to save;
the operations further comprising:
training the recurrent neural network on the training sequence in accordance with the training policy by:
forward-propagating the inputs in the training sequence from a first time step in the sequence to a last time step in the sequence;
during the forward propagating, storing forward propagation information in accordance with the training policy; and
backpropagating gradients from the last time step in the sequence to the first time step in the sequence, comprising:
determining, for each time step, whether additional forward propagation information is necessary to backpropagate the gradient for the time step and, if so, regenerating the additional forward propagation information using the stored forward propagation information.

10. A system comprising one or more computers and one or more storage devices storing instructions that when executed by one or more computers cause the one or more computers to perform operations for training a recurrent neural network on a plurality of training sequences using backpropagation through time, the operations comprising:
receiving a training sequence comprising a respective input at each of a number of time steps;
determining a training policy for processing the training sequence, wherein the training policy defines when to store forward propagation information during forward propagation of the training sequence, the training policy being such as to balance a trade-off between caching of forward propagation information and re-computation of forward propagation information during backpropagation;
wherein determining the training policy comprises:
(i) obtaining data defining an amount of memory allocated to storing forward propagation information for use during backpropagation;
(ii) determining forward propagation information in the form of candidates for storage, wherein the candidate forward propagation information can include hidden states for time steps of the recurrent neural network and/or internal states for time steps of the recurrent neural network;
(iii) identifying one or more strategies for storing forward propagation information from memory, wherein each strategy includes a sequence of candidates for storage that will be stored if following the strategy;
(iv) determining a computational cost for each strategy; wherein the computational cost $Q_1(t, m, y)$ of a strategy that includes saving a hidden state of a time step after choosing not to save hidden states for y time steps is given by:

$$Q_1(t,m,y)=y+C(y,m)+C(t-y,m-1)$$

where t is a number of time steps over which backpropagation is performed, m is a number of available memory units, C(y, m) is the lowest possible computational cost of backpropagating over a sequence of y time steps given the amount of allocated memory equal to m; and C(t−y, m−1) is the lowest possible computational cost of backpropagating over a sequence of t−y time steps given the amount of allocated memory equal to m−1, and
the computational cost $Q_2(t, m, y)$ of a strategy that includes saving internal states of a time step after choosing not to save internal states for y time steps is given by:

$$Q_2(t,m,y)=y+C(y-1,m)+C(t-y,m-\alpha)$$

where t is a number of time steps over which backpropagation is performed, m is a number of available memory units, α is a ratio of size of internal states for time steps to the size of hidden states for time steps, C(y−1, m) is the lowest possible computational cost of backpropagating over a sequence of y−1 time steps given the amount of allocated memory equal to m, and C(t−y, m−α) is the lowest possible computational cost of backpropagating over a sequence of t−y time steps given the amount of allocated memory equal to m−α;
(v) selecting the strategy having the lowest computational cost;
(vi) determining the position of next storage and type of forward propagation from the selected strategy;
(vii) dividing the sequence of time steps in the training sequence to obtain a first subsequence and second subsequence, the first subsequence including time steps before the determined position of next storage, the second subsequence including time steps after the determined position of next storage; and
recursively repeating steps (i)-(vii) for each obtained subsequence to select a position of next forward propagation information to save;
the operations further comprising:
training the recurrent neural network on the training sequence in accordance with the training policy by:
forward-propagating the inputs in the training sequence from a first time step in the sequence to a last time step in the sequence;
during the forward propagating, storing forward propagation information in accordance with the training policy; and
backpropagating gradients from the last time step in the sequence to the first time step in the sequence, comprising:
determining, for each time step, whether additional forward propagation information is necessary to backpropagate the gradient for the time step and, if so, regenerating the additional forward propagation information using the stored forward propagation information.

11. The system of claim 10, wherein the forward propagation information includes hidden states.

12. The system of claim 10, wherein the forward propagation information includes internal states.

13. The system of claim 10, wherein the forward propagation information includes both hidden states and internal states.

14. The system of claim 13, wherein the training policy defines, for each time step, whether to store a hidden state, an internal state, or neither for the time step.

15. The system of claim 10, wherein:
   determining the policy comprises:
   for each time slot, determining a computational cost of storing an associated piece of forward propagation information based on the number of time steps and the amount of memory allocated to storing the forward propagation information; and
   adding to the training policy a set of pieces of forward propagation information that are determined to have the lowest computational cost; and
   training the recurrent neural network on the training sequence in accordance with the training policy comprises storing the set of pieces of forward propagation information that have been added to the training policy.

16. The system of claim 10, the operations further comprising:
   determining a computational cost of training the recurrent neural network on the training sequence in accordance with the policy.

17. The system of claim 16, the operations further comprising: providing data identifying the computational cost for presentation to a user.

* * * * *